(12) United States Patent
Yuventi et al.

(10) Patent No.: US 11,777,292 B2
(45) Date of Patent: Oct. 3, 2023

(54) LOAD CENTER ASSEMBLY

(71) Applicant: RENU, INC., Carrollton, TX (US)

(72) Inventors: Jumie Yuventi, Menlo Park, CA (US); Douglas McCabe, Sacramento, CA (US); James Sweeney, Sacramento, CA (US); Andy Colborn, Sacramento, CA (US)

(73) Assignee: Renu, Inc., Carrollton, TX (US)

(*) Notice: Subject to any disclaimer, the term of this patent is extended or adjusted under 35 U.S.C. 154(b) by 0 days.

(21) Appl. No.: 17/224,632

(22) Filed: Apr. 7, 2021

(65) Prior Publication Data

US 2021/0313786 A1    Oct. 7, 2021

Related U.S. Application Data

(60) Provisional application No. 63/006,133, filed on Apr. 7, 2020.

(51) Int. Cl.
*H02G 3/00* (2006.01)
*H02G 3/12* (2006.01)
*H02B 1/015* (2006.01)

(52) U.S. Cl.
CPC ............. *H02G 3/125* (2013.01); *H02B 1/015* (2013.01)

(58) Field of Classification Search
CPC ................................ H02G 3/125; H02B 1/015
See application file for complete search history.

(56) References Cited

U.S. PATENT DOCUMENTS

| | | | |
|---|---|---|---|
| 3,313,073 A | | 4/1967 | Mathews |
| 3,460,281 A | * | 8/1969 | Levy ........................ H02B 1/18 40/489 |
| 3,765,543 A | | 10/1973 | Thomas |
| 3,974,607 A | | 8/1976 | Balinki |
| 3,992,839 A | | 11/1976 | LaBorde |
| 5,040,345 A | | 8/1991 | Gilmour |

(Continued)

FOREIGN PATENT DOCUMENTS

WO    WO2020014732 A1    1/2020

OTHER PUBLICATIONS

U.S. Appl. No. 29/727,329 for McKimmey publication US 20220037861 A1) (Year: 2022).*

(Continued)

*Primary Examiner* — Pete T Lee
(74) *Attorney, Agent, or Firm* — Haverstock & Owens, A Law Corporation

(57) ABSTRACT

A load center assembly is provided. The load center assembly comprises a frame, an electrical panel assembly, and a plurality of electrical wire harnesses. The frame includes a first side and a second side. The first side and the second side are substantially parallel and connected by a plurality of cross members. The electrical panel assembly is connected to the first side and the second side. The electrical panel assembly includes a plurality of breakers. The plurality of electrical wires harnesses is connected to the frame. Each of the plurality of electrical wire harnesses includes a plurality of wires. A first end of each wire of the plurality of wires is routed into the electrical panel assembly and is terminated in a corresponding breaker. The load center assembly is configured to be disposed in a wall frame.

25 Claims, 15 Drawing Sheets

(56) References Cited

U.S. PATENT DOCUMENTS

| | | |
|---|---|---|
| 5,313,752 A | 5/1994 | Hatzinikolas |
| 5,685,113 A | 11/1997 | Reuter |
| 5,689,922 A | 11/1997 | Daudet |
| 5,706,620 A | 1/1998 | DeZen |
| 5,996,296 A | 12/1999 | Bisbee |
| 6,189,269 B1 | 2/2001 | DeZen |
| 6,430,881 B1 | 8/2002 | Daudet |
| 6,647,691 B2 | 11/2003 | Becker |
| 6,658,808 B1 | 12/2003 | Doherty |
| 7,197,853 B1 | 4/2007 | Little, Jr. |
| 7,596,924 B2 | 10/2009 | Sakae |
| 7,614,199 B2 | 11/2009 | Smalley, III |
| 7,665,257 B2 | 2/2010 | Posey |
| 7,677,009 B2 | 3/2010 | Bowman |
| 7,703,248 B2 | 4/2010 | Dincel |
| 7,752,817 B2 | 7/2010 | Pilz |
| 8,347,560 B2 | 1/2013 | Gyory |
| 8,413,394 B2 | 4/2013 | Pilz |
| 8,555,566 B2 | 10/2013 | Pilz |
| 8,677,713 B1 | 3/2014 | Sheehy |
| 9,007,745 B1* | 4/2015 | Flegel ............... H02B 1/16 361/627 |
| 9,627,863 B1* | 4/2017 | Harrison ............. H02B 3/00 |
| 10,041,243 B2 | 8/2018 | Walker |
| 10,227,785 B2 | 3/2019 | McCaffrey |
| 10,619,347 B2 | 4/2020 | Pilz |
| D888,286 S | 6/2020 | Spear |
| 11,313,121 B2 | 4/2022 | Quirijns |
| 11,560,712 B2 | 1/2023 | Pilz |
| 2002/0020120 A1 | 2/2002 | McKenzie |
| 2003/0196401 A1 | 10/2003 | Surowiecki |
| 2007/0056245 A1 | 3/2007 | Edmondson |
| 2008/0053016 A1 | 3/2008 | Kang |
| 2008/0229696 A1 | 9/2008 | Benson |
| 2010/0058686 A1 | 3/2010 | Henriquez |
| 2013/0019549 A1 | 1/2013 | Henriquez |
| 2013/0205694 A1 | 8/2013 | Stahl, Jr. |
| 2015/0275521 A1 | 10/2015 | Bader et al. |
| 2015/0368898 A1 | 12/2015 | Stahl, Jr. |
| 2016/0217957 A1* | 7/2016 | Kumar ............... H01H 71/08 |
| 2016/0241002 A1* | 8/2016 | Tremaine ........... H02B 1/44 |
| 2017/0063051 A1* | 3/2017 | Sharp ................ H02B 1/14 |
| 2017/0089763 A1* | 3/2017 | Freer ............... G01R 19/0092 |
| 2017/0169979 A1* | 6/2017 | Mittelstadt ......... H01H 71/128 |
| 2017/0342736 A1 | 11/2017 | Roshinsky |
| 2018/0038103 A1 | 2/2018 | Newmayr |
| 2019/0006827 A1* | 1/2019 | Gintz ............... H02G 3/0437 |
| 2019/0245335 A1* | 8/2019 | McKenny ............. H02G 3/14 |
| 2019/0316350 A1 | 10/2019 | Pilz |
| 2020/0119551 A1* | 4/2020 | Saylor .............. H02J 3/14 |
| 2022/0037861 A1* | 2/2022 | McKimmey ........... H02G 3/00 |

OTHER PUBLICATIONS

International Search Report dated May 18, 2022, in International Application No. PCT/US22/17555, 23 pages.

* cited by examiner

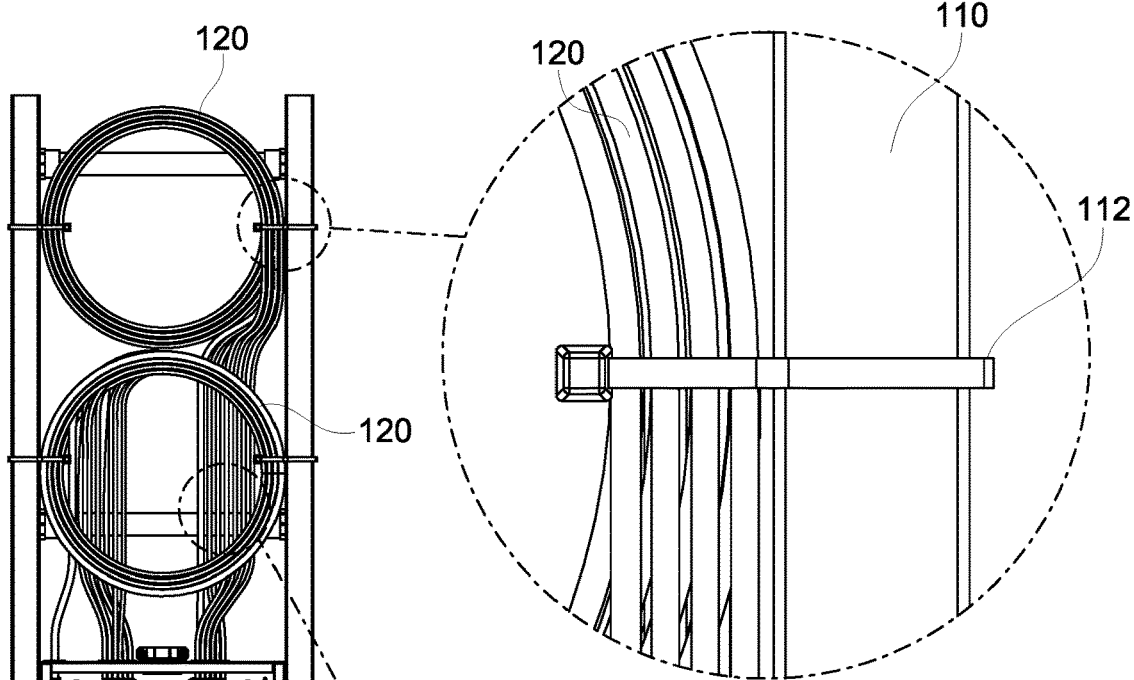
FIG. 3
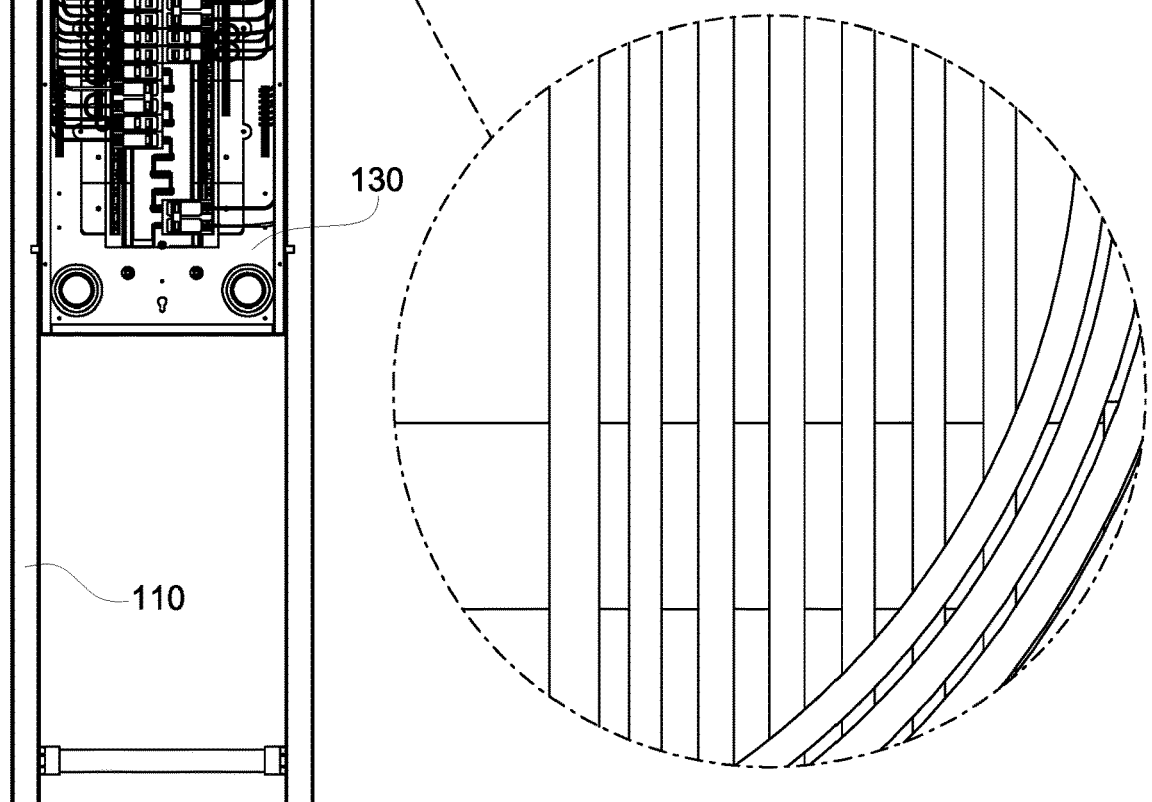
FIG. 4
FIG. 2

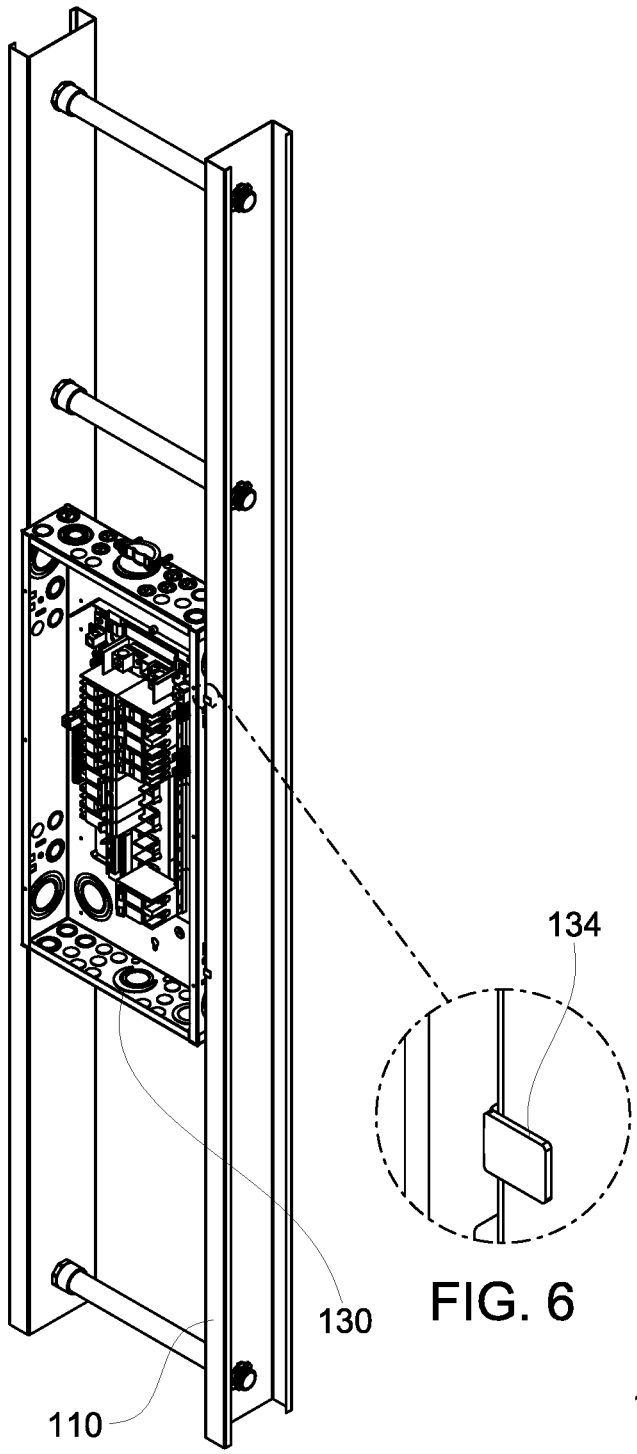
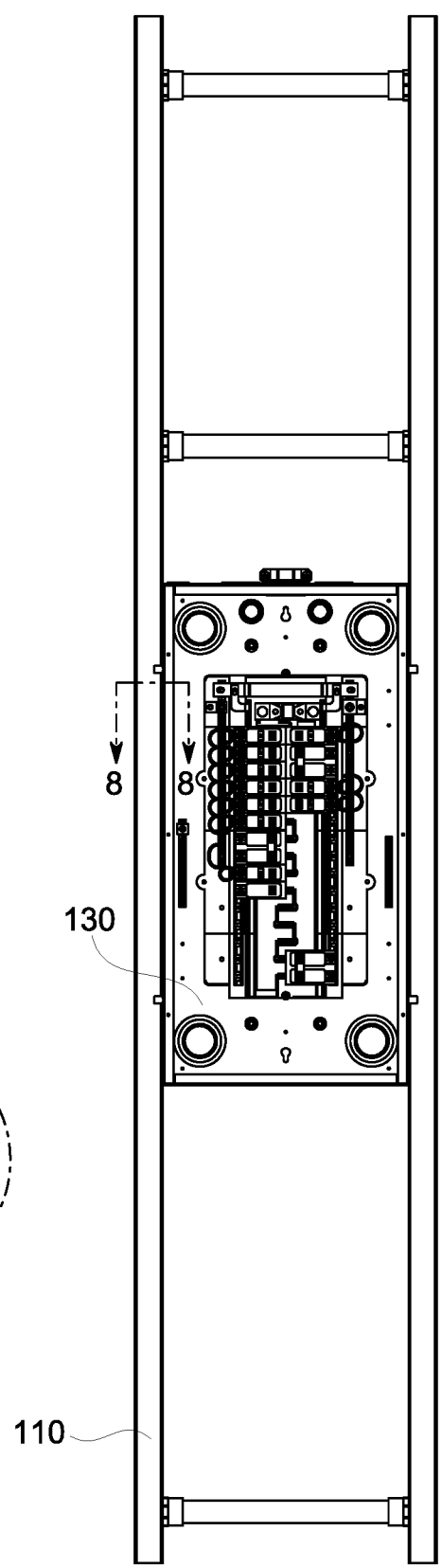
FIG. 5
FIG. 6
FIG. 7

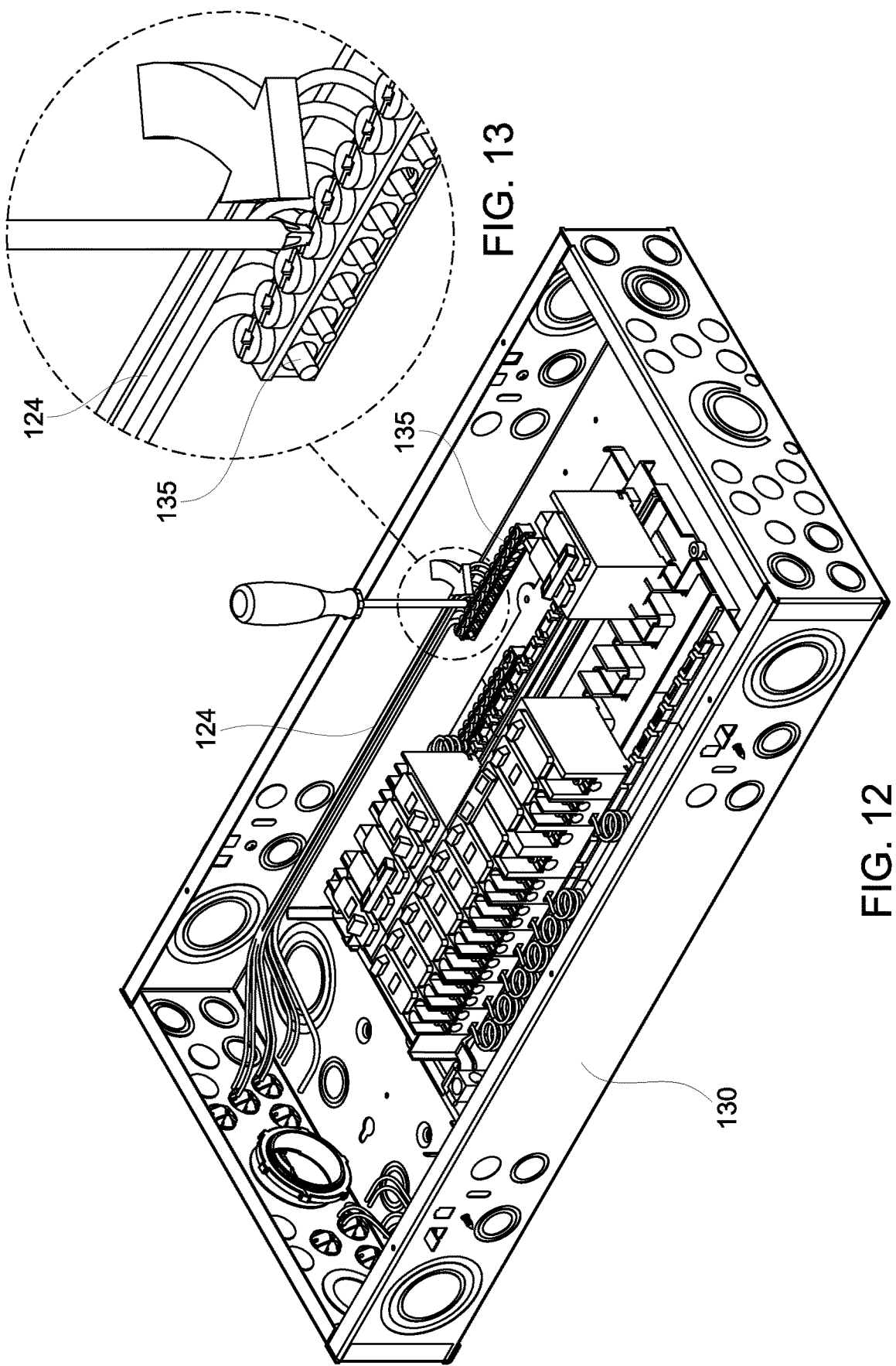

LOAD CENTER ASSEMBLY

CROSS REFERENCE TO RELATED APPLICATION

This application claims the benefit of U.S. Provisional Application No. 63/006,133 for LOAD CENTER ASSEMBLY filed on Apr. 7, 2020, which is incorporated by reference as if fully set forth.

FIELD OF INVENTION

The present invention relates generally to the art of building construction, and more specifically to the installation of electrical systems for buildings.

BACKGROUND

Utility connections such as electrical connections are typically installed on site piece by piece. Installing these components is tedious and time consuming, which ultimately results in higher construction costs.

SUMMARY

A load center assembly is provided. The load center assembly comprises a frame, an electrical panel assembly, and a plurality of electrical wire harnesses. The frame includes a first side and a second side. The first side and the second side are substantially parallel and connected by a plurality of cross members. The electrical panel assembly is connected to the first side and the second side. The electrical panel assembly includes a plurality of breakers. The plurality of electrical wires harnesses is connected to the frame. Each of the plurality of electrical wire harnesses includes a plurality of wires. A first end of each of the plurality of wires is routed into the electrical panel assembly and is terminated in a corresponding breaker. The load center assembly is configured to be disposed in a wall frame.

A wall is also provided. The wall includes a wall frame and a load center assembly. The wall frame includes a top plate, a bottom plate, a first stud, and a second stud. The load center assembly includes the same features and embodiments described above. The first side of the frame of the load center assembly is connected to the first stud and the second side of the frame of the load center assembly is connected to the second stud.

BRIEF DESCRIPTION OF THE DRAWINGS

The foregoing summary, as well as the following detailed description will be better understood when read in conjunction with the appended drawings. For the purpose of illustration, there is shown in the drawings different embodiments. It should be understood, however, that the teachings are not limited to the precise load center assembly shown.

FIG. 2 shows a front view of the load center assembly.
FIG. 3 shows a magnified view of the connection of the wire harness to the frame.
FIG. 4 shows a magnified view of the organization of the wires or cables of the wire harnesses.
FIG. 5 illustrates the panel assembly secured to the frame.
FIG. 6 shows a magnified view of a tab used to control and align the placement of the panel assembly in the frame.
FIG. 7 shows a front view of the panel assembly secured to the frame.
FIG. 12 shows the copper ground wires terminated to ground bars.
FIG. 13 shows a magnified view of the wires being grounded to a ground bar.

DETAILED DESCRIPTION

Figure 1:
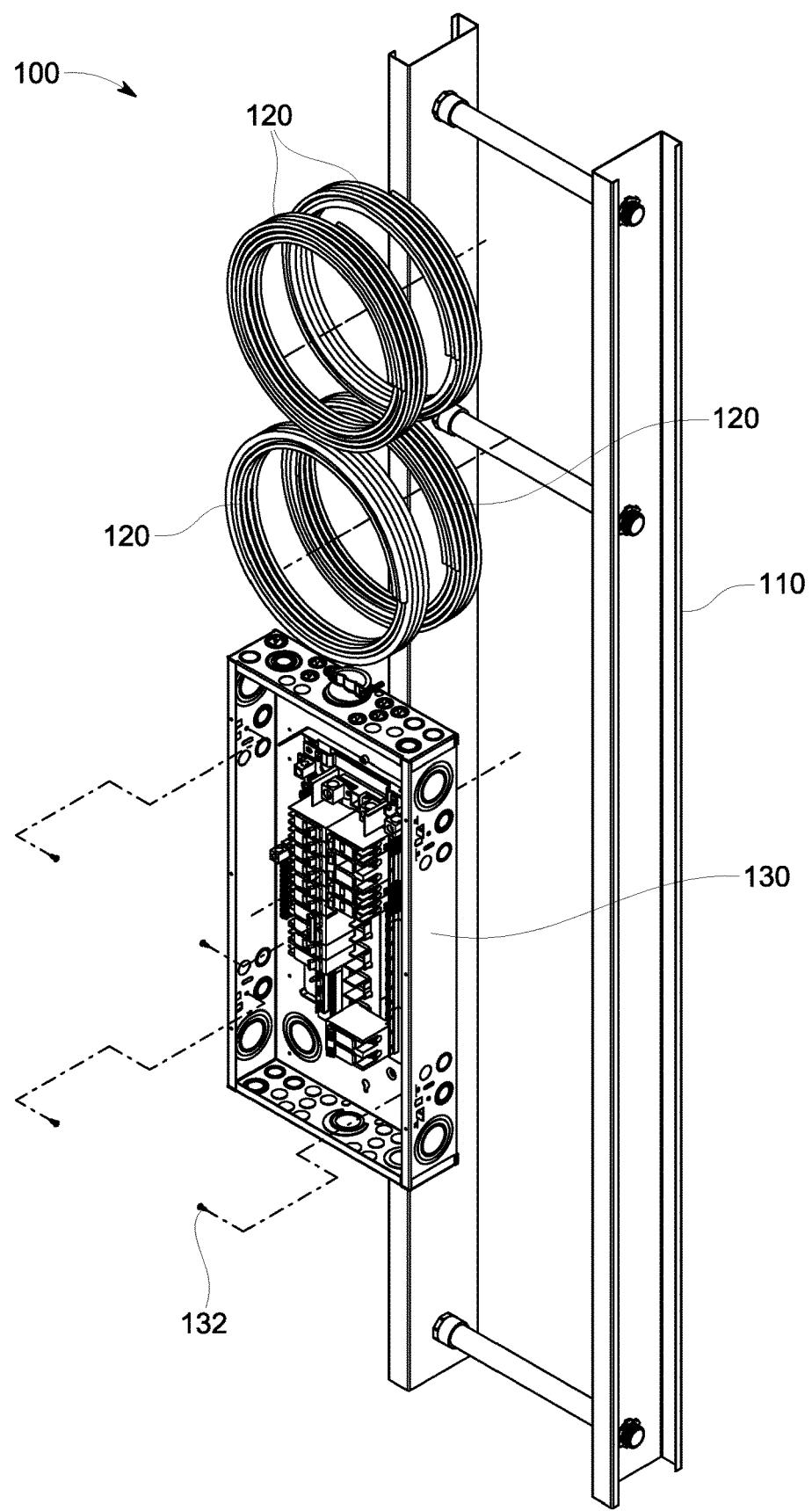
FIG. 1 shows an exploded view of a load center assembly.

FIG. 1 shows an exploded view of a load center assembly 100. The load center assembly 100 is an electro-mechanical system that packages multiple, typically disparate, devices and subcomponents in a manner that minimizes installer interactions to the points of common coupling with the rest of a building system. The load center assembly 100 minimizes points of coupling including the load side termination of branch circuits originating from the electrical panel, termination of the feeder circuit to the electrical panel, and physical attachment of the assembly to the building frame, wall, ceiling, floor, etc. All other nodes, interfaces, electrical circuitry/devices, and mechanical provisions to enable functioning and structural integrity are captured within the load center assembly 100. These features reduce the installation labor and costs of the load center assembly 100. The load center assembly 100 includes a frame 110, a plurality of wire harnesses 120, and a panel assembly 130. The load center assembly 100 may be assembled in the factory and shipped assembled to a final location. The frame 110 may be made from cold formed steel (CFS). The frame 110 supports and secures the wire harnesses 120 and the panel assembly 130. The plurality of wire harnesses 120 are each an assembly of electrical cables or wires configured to transmit signals or electrical power. The wires in the wire harness 120 are bound by rubber, vinyl, electrical tape, conduit, etc. The panel assembly 130 may be a standard electrical panel assembly configured to contain electrical devices that control and monitor electricity for an apartment. The panel assembly 130 may also include fasteners 132 configured to secure the panel assembly 130 to the frame 110. The fasteners 132 may be self-drilling sheet metal screws.

FIG. 2 shows a front view of the load center assembly 100. As shown in FIG. 2, the panel assembly 130 and the plurality of wire harnesses 120 are secured to the frame 110. The panel assembly 130 and the plurality of wire harnesses 120 are secured to the frame 110 in the factory. The assembled load center assembly 100 is then shipped to the work site. The panel assembly 130 is secured to the frame 110 via the fasteners 132 shown in FIG. 1. The wire harnesses 120 are secured to the frame 110 above the panel assembly 130. The wire harnesses 120 are secured above the panel assembly 130 to allow the first ends of the wires or cables in the wire harnesses 120 to be routed into the top of the panel assembly 130.

FIG. 3 shows a magnified view of the connection of the wire harness 120 to the frame 110. As shown in FIG. 3 the wire harnesses 120 are secured to the frame 110. The wire harnesses 120 may be secured to the frame 110 with a suitable fastener 112 such as a cable or zip tie. All individual cables or wires from the wire harnesses 120 may be secured to the frame 110 with conduit strips. The printing of wires or cables is clearly visible above the panel assembly 130.

FIG. 4 shows a magnified view of the organization of the wires or cables of the wire harnesses 120. As shown in FIG. 4 the cables or wires from the top wire harnesses 120 are layered behind the lower wire harnesses 120. The wires or cables are organized so each wire or cable can easily access the top of the panel assembly 130.

FIG. 5 illustrates the panel assembly 130 secured to the frame 110. The panel assembly 130 fits within the frame 110. The panel assembly 130 is secured to the frame 110 via the fasteners 132 shown in FIG. 1. Tabs 134 may be connected to the outside of the panel assembly 130 to facilitate and control the insertion and alignment of the panel assembly 130 in the frame 110 as shown in FIG. 6.

Figure 8:
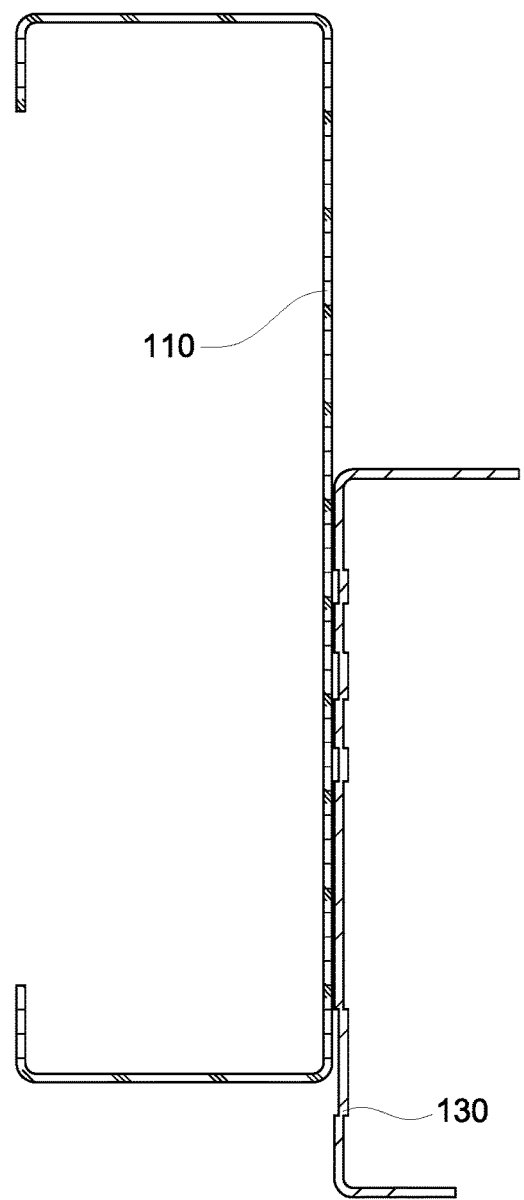
FIG. 8 shows cross-section 8-8 from FIG. 7.

FIG. 7 shows a front view of the panel assembly 130 secured to the frame 110. FIG. 8 shows cross-section 8-8 from FIG. 7. The cross section shows the alignment of a stud of the frame 110 and the panel assembly 130.

Figure 9:
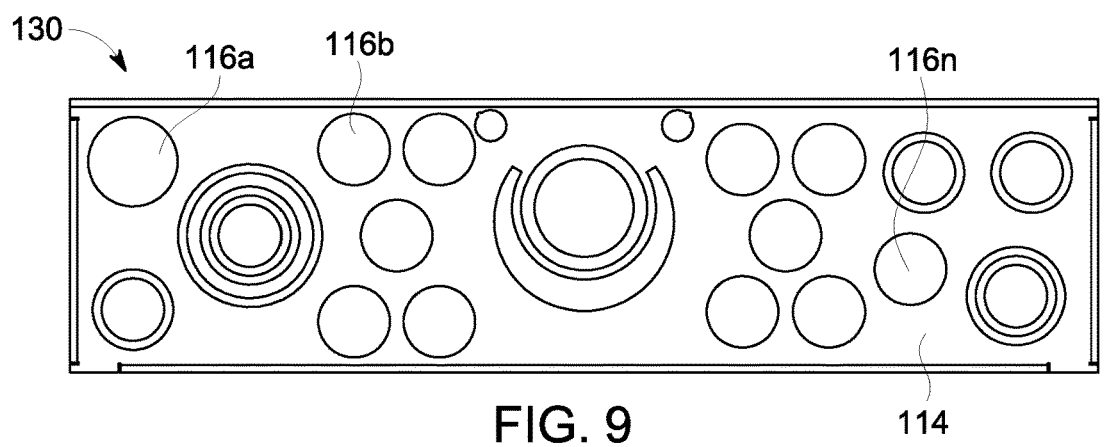
FIG. 9 shows a top view of the panel assembly.

FIG. 9 shows a top view of the panel assembly 130. FIG. 9 shows the top 114 of the panel assembly 130. The top 114 includes a plurality of openings 116a-n. The openings 116a-n may be pre-punched or pre-drilled into the top 114 of the panel assembly 130. The location of the openings 116a-n may be predetermined. The openings 116a-n are configured to receive cables or wires from the wire harnesses 120. Specific cables and wires from the wire harnesses 120 are matched to specific holes 116a-n. The specific cables and wires are pulled into the panel assembly 130 through the holes 116a-n. The holes 116a-n position and organize the wires from the cable harnesses 120 as the wires and cables are directed into the panel assembly 130.

Figure 10:
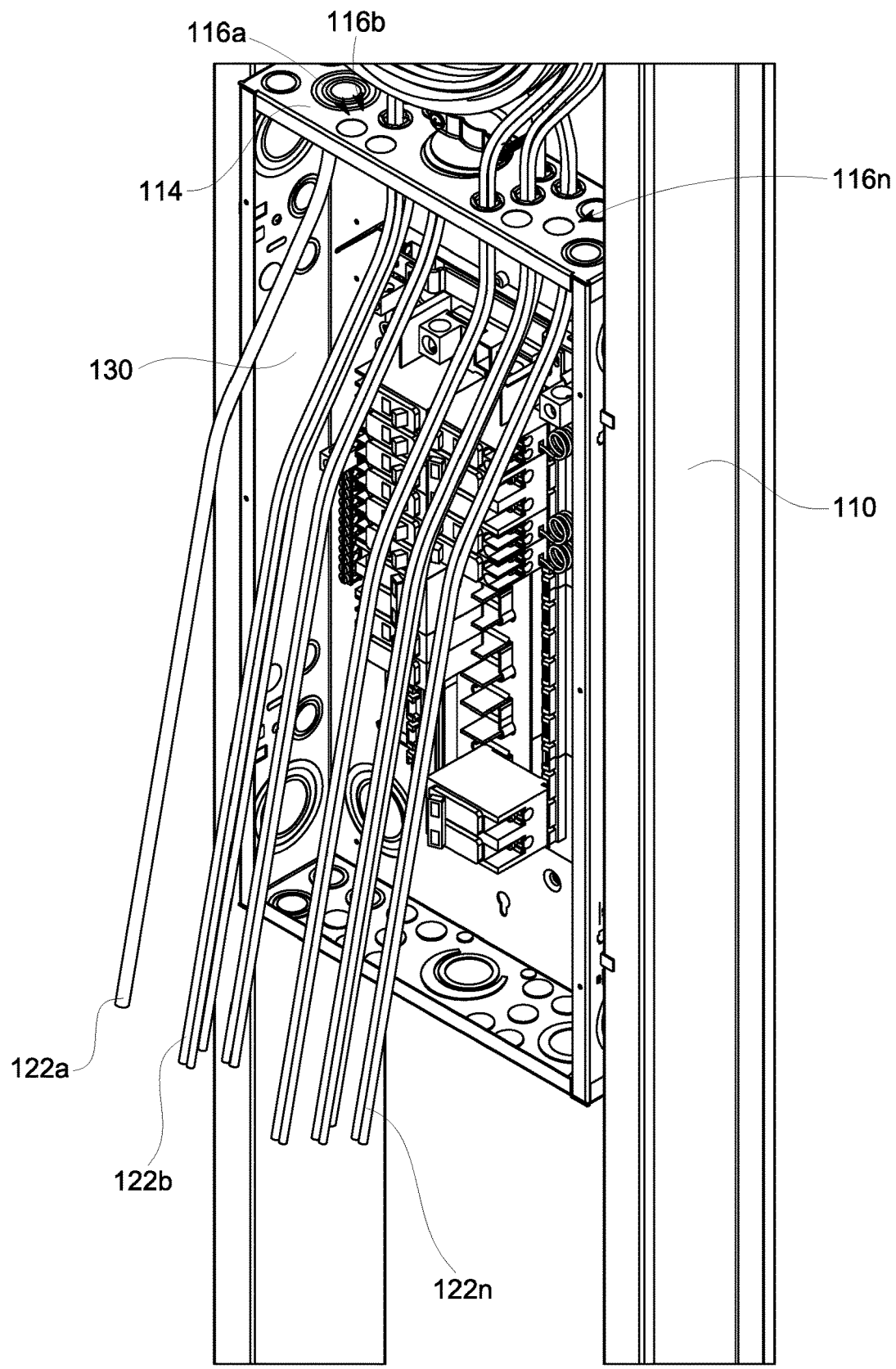
FIG. 10 shows cables or wires routed through the top of the panel assembly.

FIG. 10 shows cables or wires routed through the top 114 of the panel assembly 130. The ends of cables 122a-n are routed through the openings 116a-n of the top 114 of the panel assembly 130 and pulled into the panel assembly 130. Ends of cables 122a-n are stripped of the black sheathing and inserted and terminated into breakers into the panel assembly 130.

Figure 11:
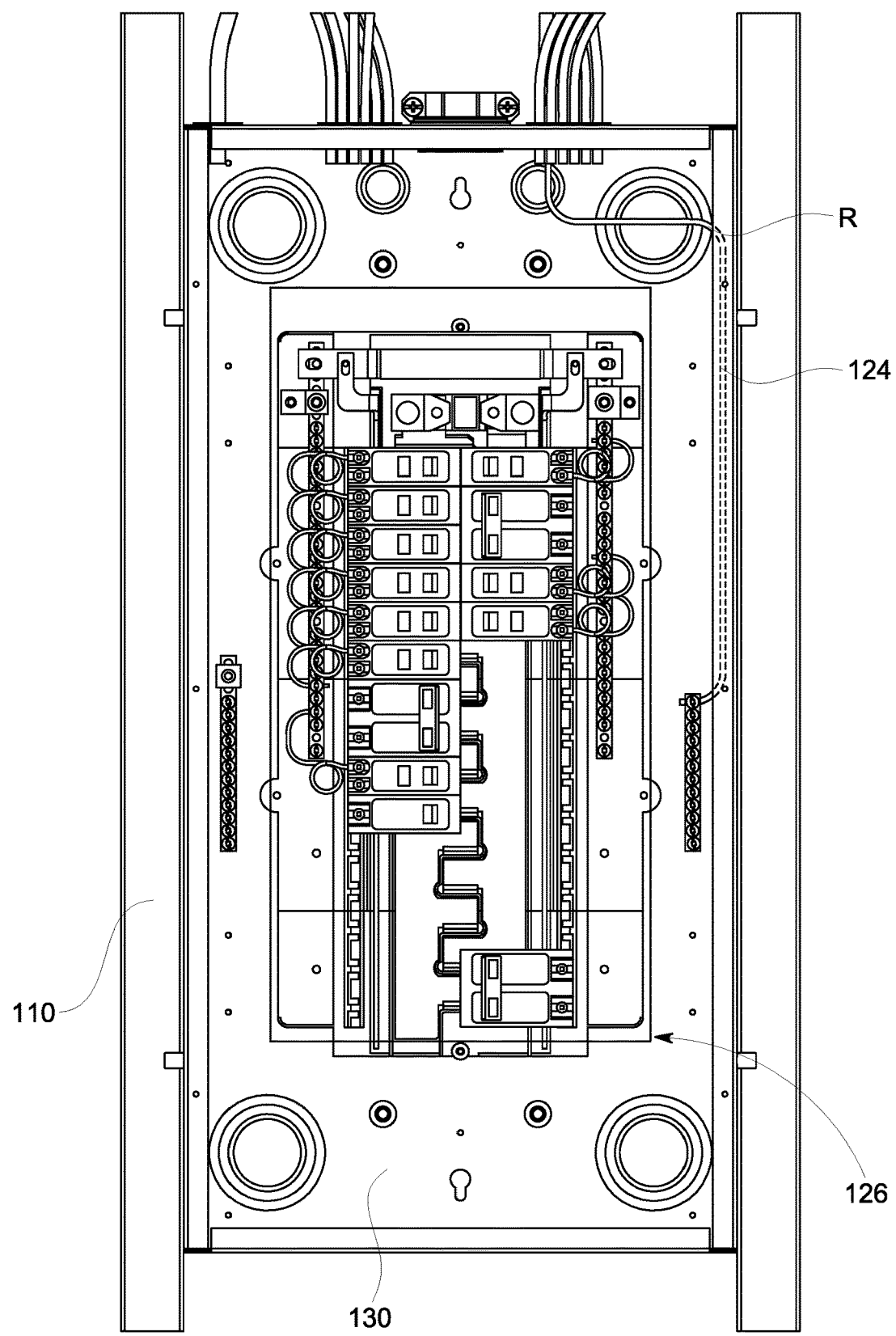
FIG. 11 shows a front view of the inside of the panel assembly.

FIG. 11 shows a front view of the inside of the panel assembly 130. The ends of the cables or wires 122 are pulled out of the way to run copper ground wires 124 into the panel assembly 130. The copper wires 124 are routed along the outside of the panel assembly 130. The copper wires 124 should maintain a minimum radius R inside the panel assembly 130 as the wire 124 changes direction. The minimum radius R of the wire 124 inside the panel assembly 130 may be 0.75 inch. The copper ground wires 124 should maintain a minimum distance from a zone 126 including the breakers and neutral bars. The minimum distance between the zone 126 and the copper ground wires 124 may be 1 inch.

FIG. 12 shows the copper ground wires 124 terminated to ground bars 135. FIG. 13 shows a magnified view of the wires 124 being grounded to a ground bar 135.

Figures 14, 15:
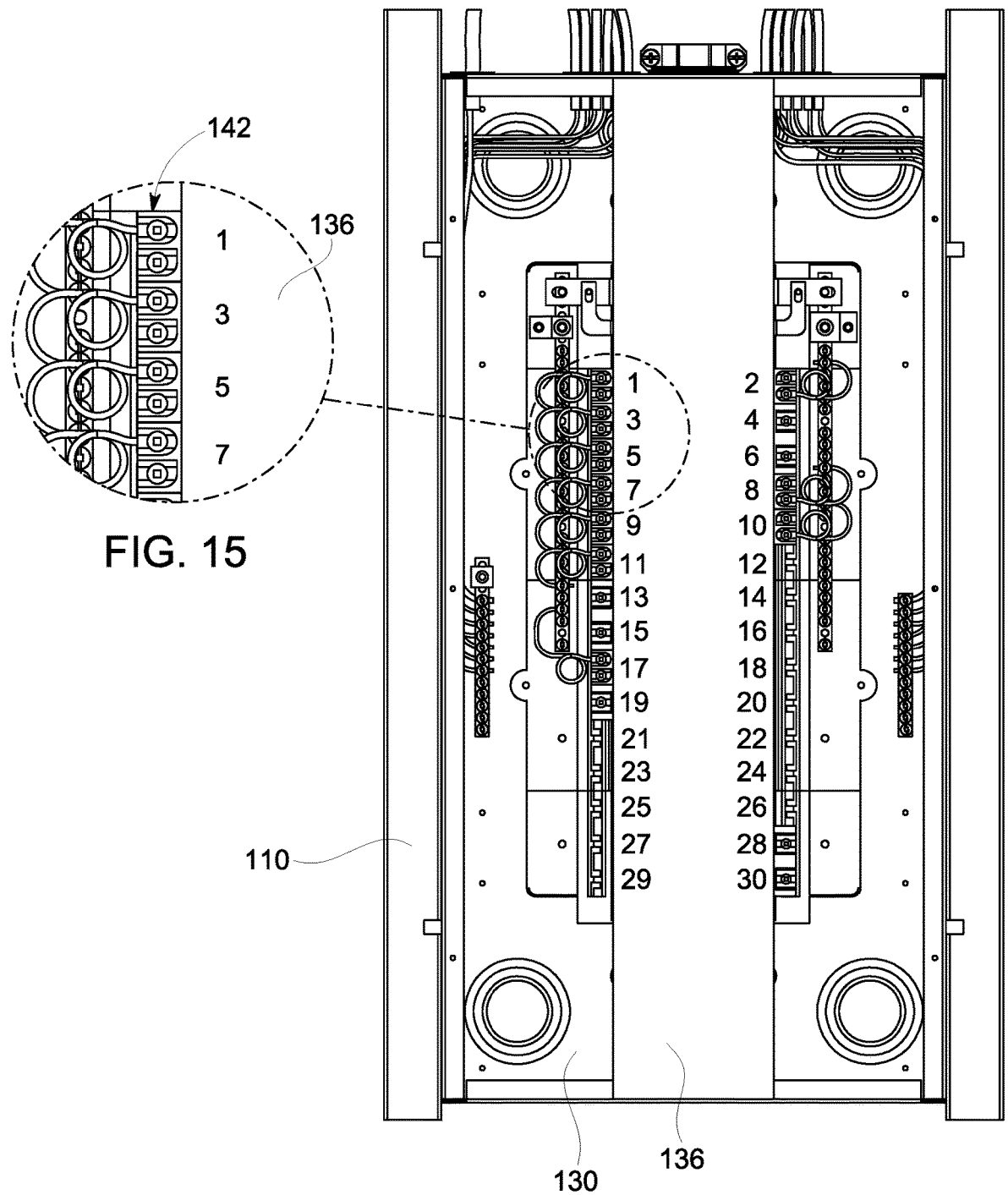
FIG. 14 shows a front view of the panel assembly with a circuit guide.
FIG. 15 shows a magnified view of the edge of the circuit guide identifying the breakers with numbers.

FIG. 14 shows a front view of the panel assembly 130 with a circuit guide 136. FIG. 15 shows a magnified view of the edged of the circuit guide 136 identifying the breakers 142 with numbers. The circuit guide 136 may be magnetic. The magnetic circuit guide 136 is secured to the metal panel assembly 130 via a magnet. The circuit guide 136 is placed to identify the breakers 142. The circuit guide 136 may identify the breakers 142 in the panel assembly 130 with numbers on the circuit guide 136.

Figure 16:
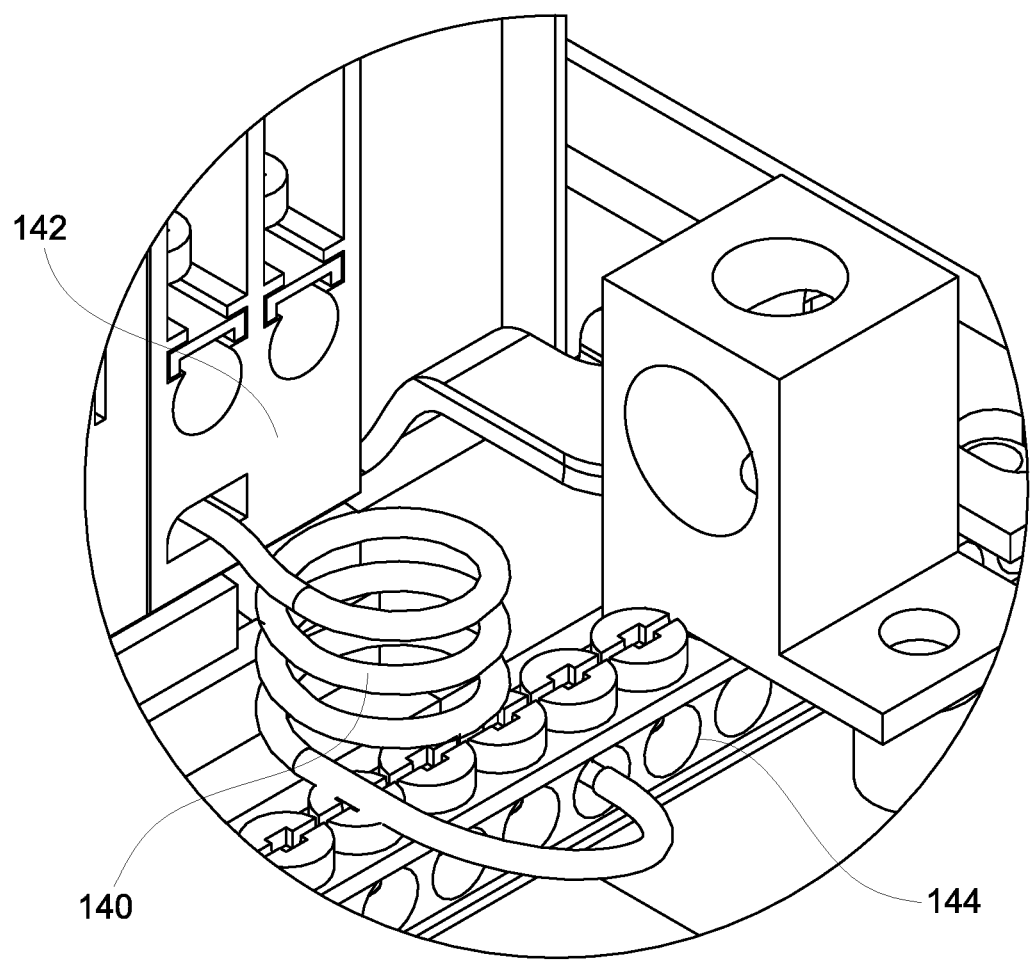
FIG. 16 shows a pigtail wire attached to a breaker and terminated to an adjacent neutral bar.

FIG. 16 shows a pigtail wire 140 attached to a breaker 142 and terminated to an adjacent neutral bar 144. The ends of the pigtail wire 140 are stripped prior to being terminated in the neutral bar 144. All remaining white wires 140 are terminated to the neutral bar 144 adjacent the circuit breakers 142.

Figure 18:
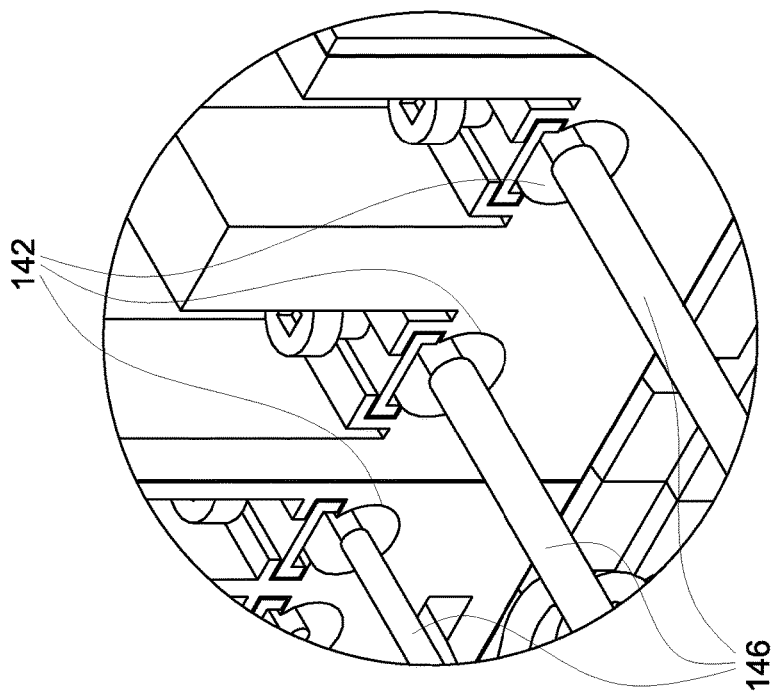
FIG. 18 shows a magnified view of the red or black hot wires terminated in corresponding breakers.
Figure 17:
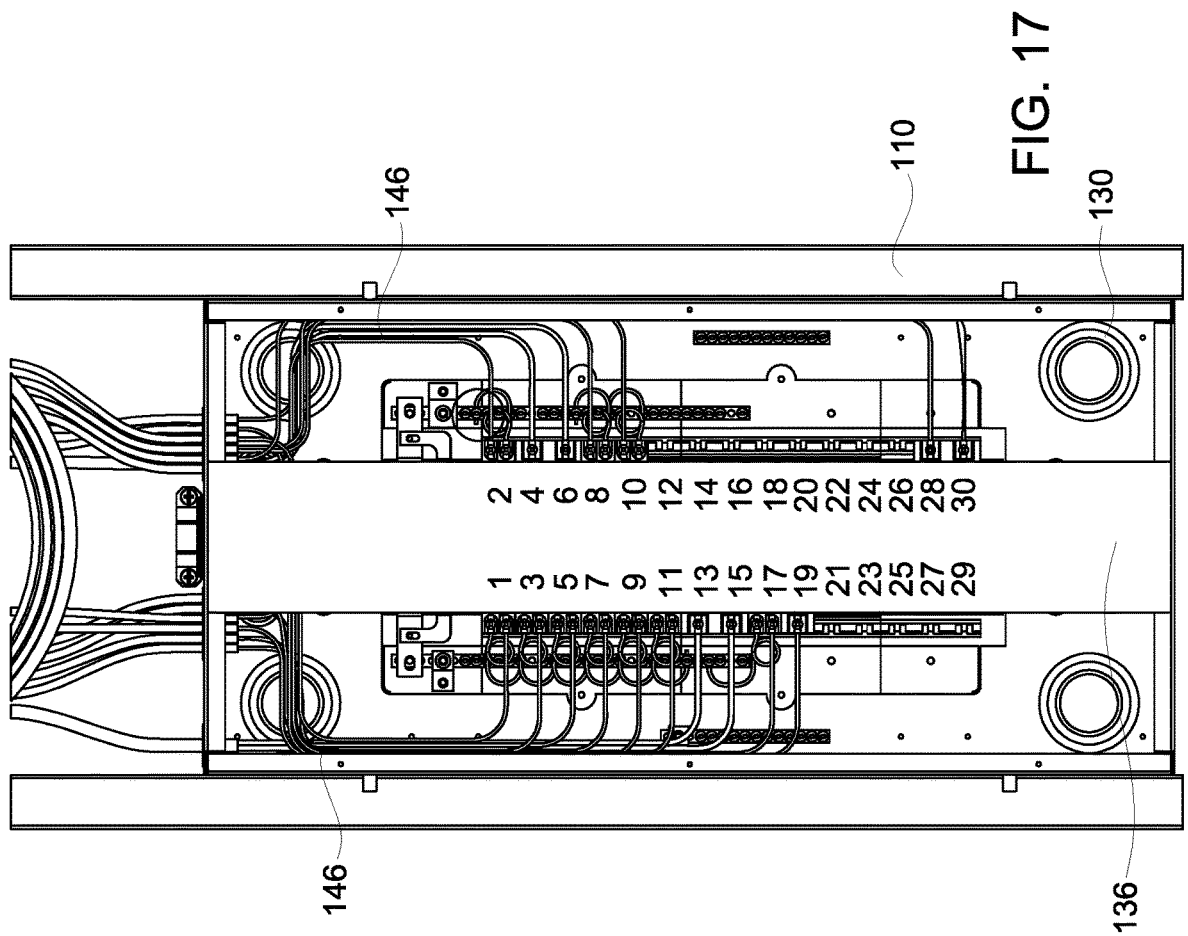
FIG. 17 shows a front view of the panel assembly with a plurality of red or black hot wires terminated to breakers.

FIG. 17 shows a front view of the panel assembly 130 with a plurality of red or black hot wires 146 terminated to breakers 142. FIG. 18 shows a magnified view of the red or black hot wires 146 terminated in corresponding breakers 142. Each red or black hot wire 146 is matched to a corresponding breaker 142. The red or black hot wires 146 are routed along the outside edge of the panel assembly 130 to the breakers 142. The ends of the red or back hot wires 146 are stripped prior to being terminated into the breakers 142. After the wires 146 are matched and terminated to the corresponding breakers 142, the circuit guide 136 may be removed from the panel assembly 130 for reuse.

Figures 19, 20:
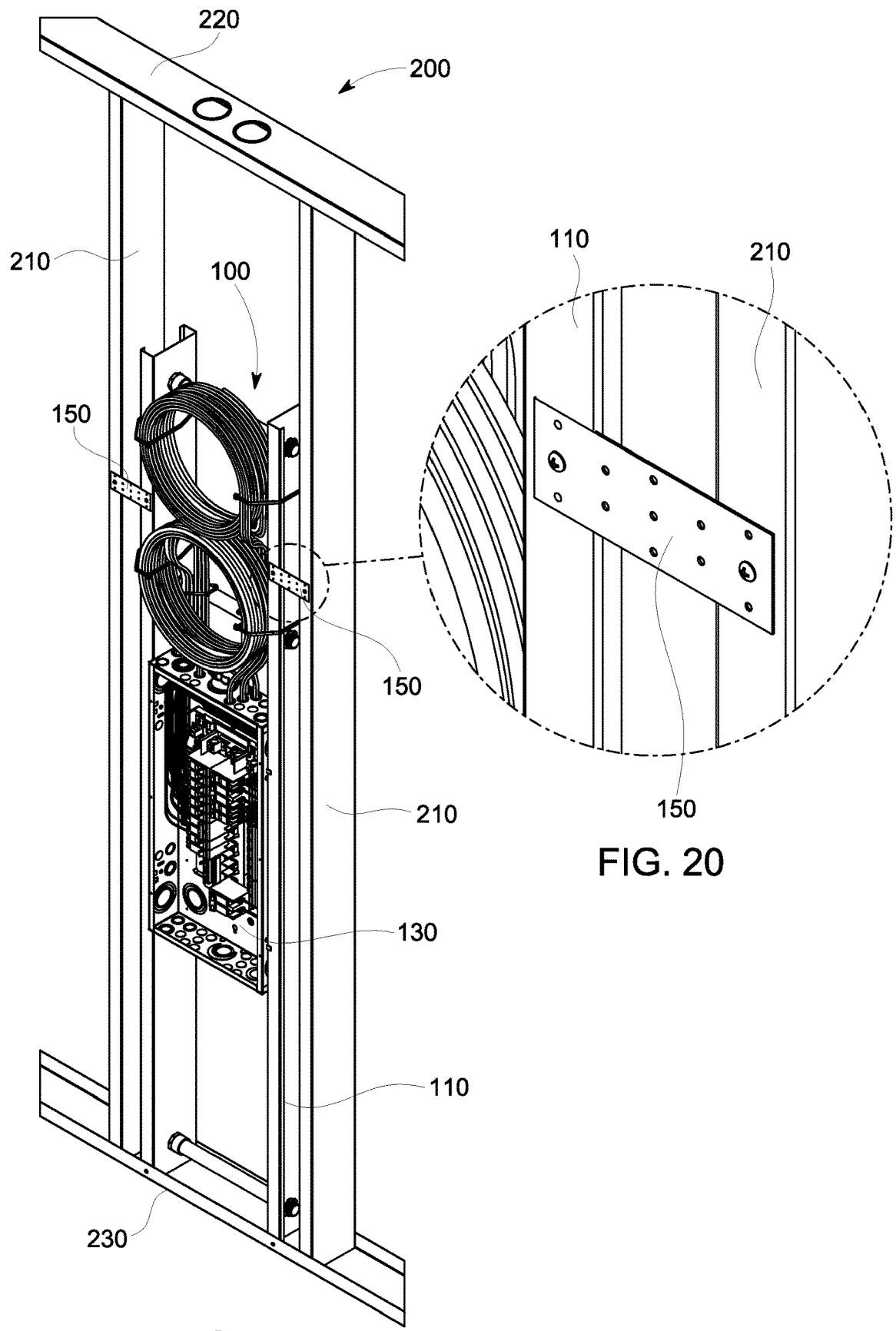
FIG. 19 shows a perspective view of a load center assembly installed in the frame of a wall.
FIG. 20 shows a magnified view of a fastener connection of the frame of the load center assembly and the stud.

After the load center assembly 100 is assembled in the factory. It is shipped to a final location. Once on site, the load center assembly 100 is installed into a wall frame 200. Alternatively, the wall frame 200 and load center assembly 100 may be assembled in a factory. The wall frame 200 and connected load center assembly 100 may be shipped to a final location. FIG. 19 shows a perspective view of a load center assembly 100 installed in the frame 200 of a wall. The frame 200 of the wall may be cold formed steel or wood. The load center assembly 100 is placed between adjacent studs 210 of the wall frame 200. The frame 110 of the load center assembly 100 is secured to studs 210 of the wall frame 200. The frame 110 of the load center assembly 100 is secured to each stud 210 with a fastener 150. Alternatively, the load center assembly 100 may be secured to a top plate 220 and/or a bottom plate 230 of the wall frame 200 rather than the studs 210 of the frame 200. FIG. 20 shows a magnified view of a fastener 150 connection of the frame 110 of the load center assembly 100 and a stud 210. Although only two fasteners 150 are shown in FIG. 19, more fasteners 150 may be used to secure the frame 110 of the load center assembly 100 to the studs 210 of the wall frame 200. Moreover, fasteners 150 may also connect the frame 110 of the load center assembly 100 to the studs 210 of the wall frame 200 on the back or rear side. Alternatively, these fasteners 150 may be used to secure the frame 110 of the load center assembly 100 to the top plate 220 and the bottom plate 230.

Figure 21:
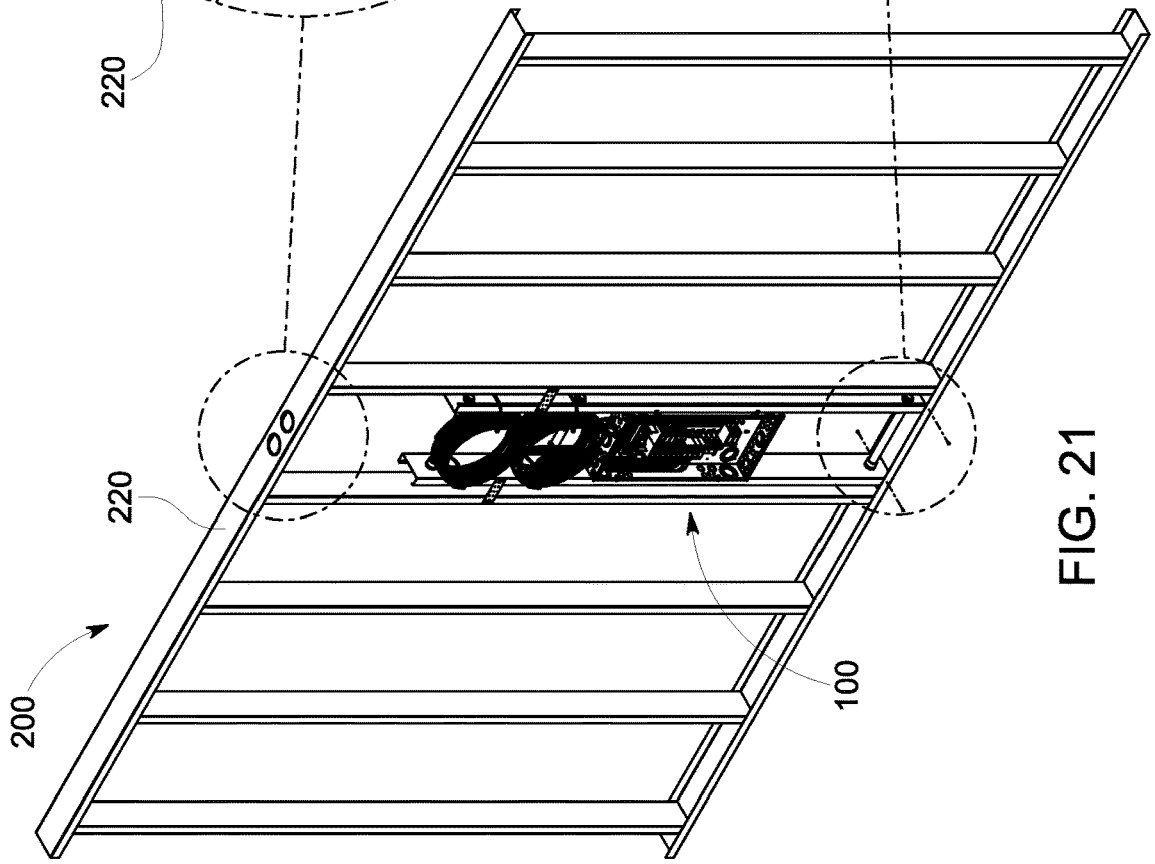
FIG. 21 shows another perspective view of the load center assembly installed in the wall frame.

FIG. 21 shows another perspective view of the load center assembly 100 installed in the wall frame 200. The wall frame 200 also includes the top plate 220 and the bottom plate 230. The top plate 220 includes openings 222 for the cables and wires from the wire harnesses 120 to be unwound and extended up through the openings 222 in the top plate 220. The bottom of the frame 110 of the load center assembly 100 may also be attached to the bottom plate 230 of the wall frame 200.

Figure 23:
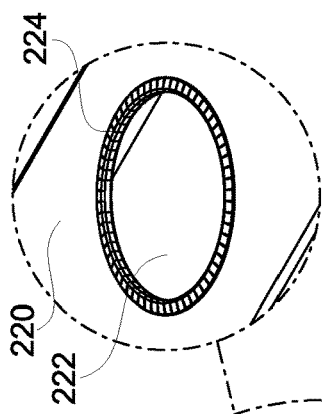
FIG. 23 shows a magnified view of one of the openings.
Figure 22:
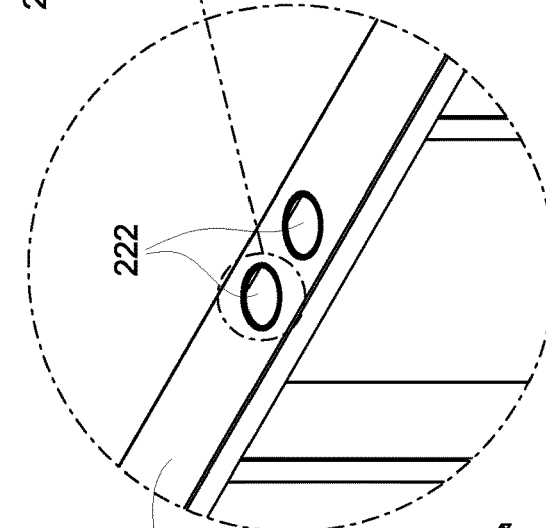
FIG. 22 shows a magnified view of the openings in the top plate.

FIG. 22 shows a magnified view of the openings 222 in the top plate 220. Although FIG. 22 shows two openings 222, the top plate 220 may include additional openings 222. The openings 222 allow the cables or wires to extend there through and run overhead in a ceiling to their designated locations. FIG. 23 shows a magnified view of one of the openings 222. As shown in FIG. 23, the opening 222 may include a grommet edging 224. The grommet edging 224 protects the cable or wires extending through the opening 222.

Figure 24:
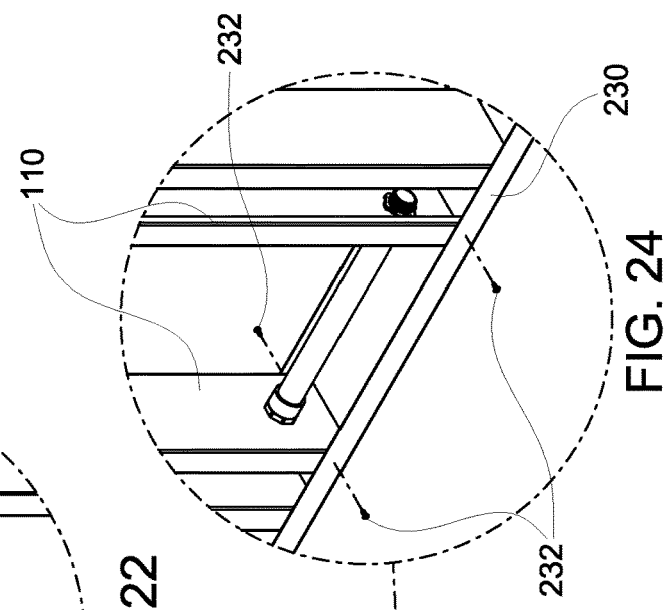
FIG. 24 shows a magnified view the bottom of the frame of the load center assembly attached to the bottom plate of the wall frame.

FIG. 24 shows a magnified view the bottom of the frame 110 of the load center assembly 100 attached to the bottom plate 230 of the wall frame 200. The bottom of the frame 110 may be secured to the bottom plate 230 via fasteners 232.

Figure 25:
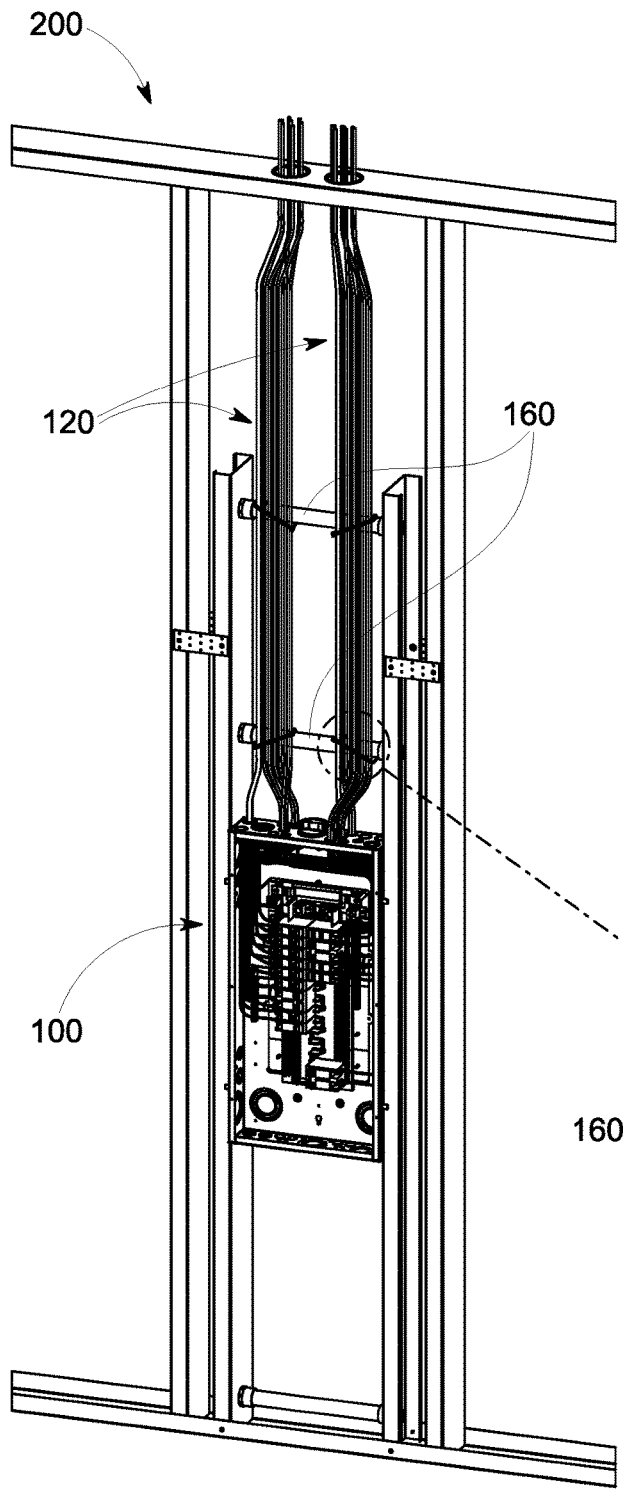
FIG. 25 shows a view of the load center assembly installed in the wall frame with the wire harnesses unwound.
Figure 26:
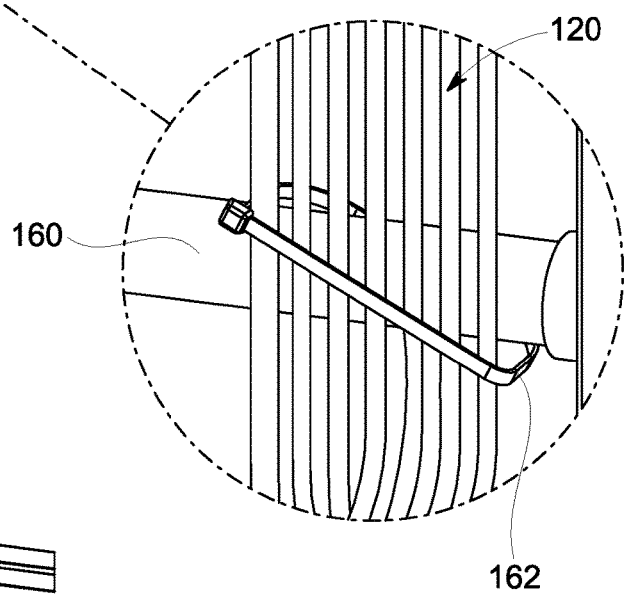
FIG. 26 shows a magnified view of the cable or wires of the wire harnesses secured to a cross member of the frame.

FIG. 25 shows a view of the load center assembly 100 installed in the wall frame 200 with the wire harnesses 120 unwound. FIG. 26 shows a magnified view of the cable or wires of the wire harnesses 120 secured to a cross member 160 of the frame 110. The cross member 160 may be a pipe or rod. As shown in FIG. 26 the cable or wires of the unwound wire harnesses 120 may be secured to the cross member 160 via a fastener 162 such as a cable or zip tie.

Figure 27:
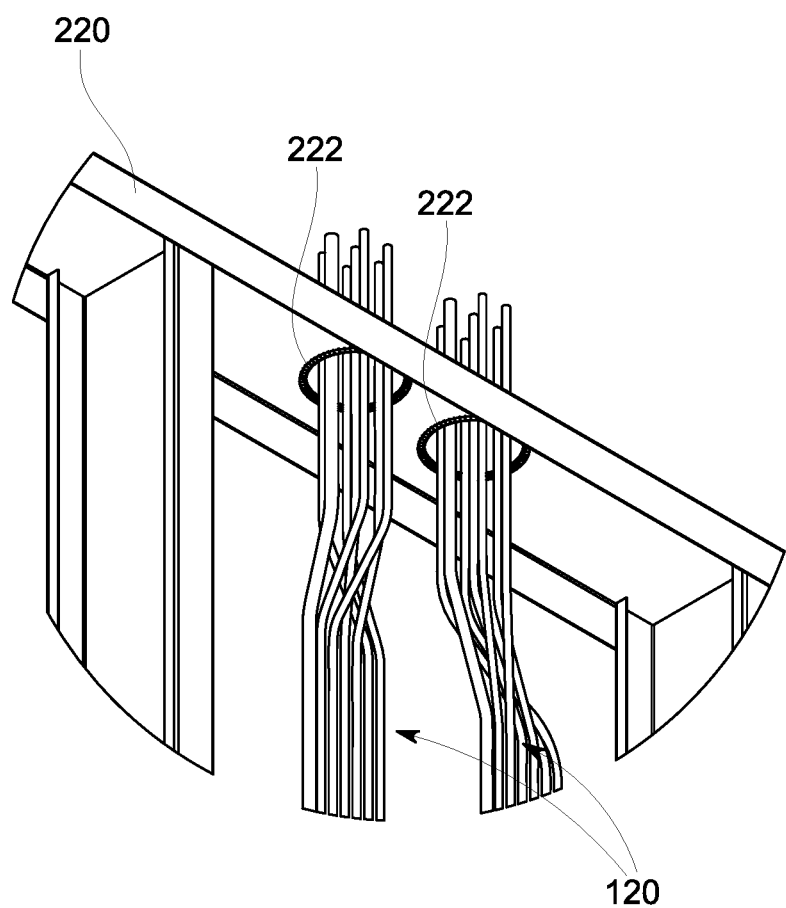
FIG. 27 shows the cables or wires of the unwound cable harnesses extending up through the openings in the top plate of the wall frame.

FIG. 27 shows the cables or wires of the unwound cable harnesses 120 extending up through the openings 222 in the top plate 220 of the wall frame 200.

Figure 28:
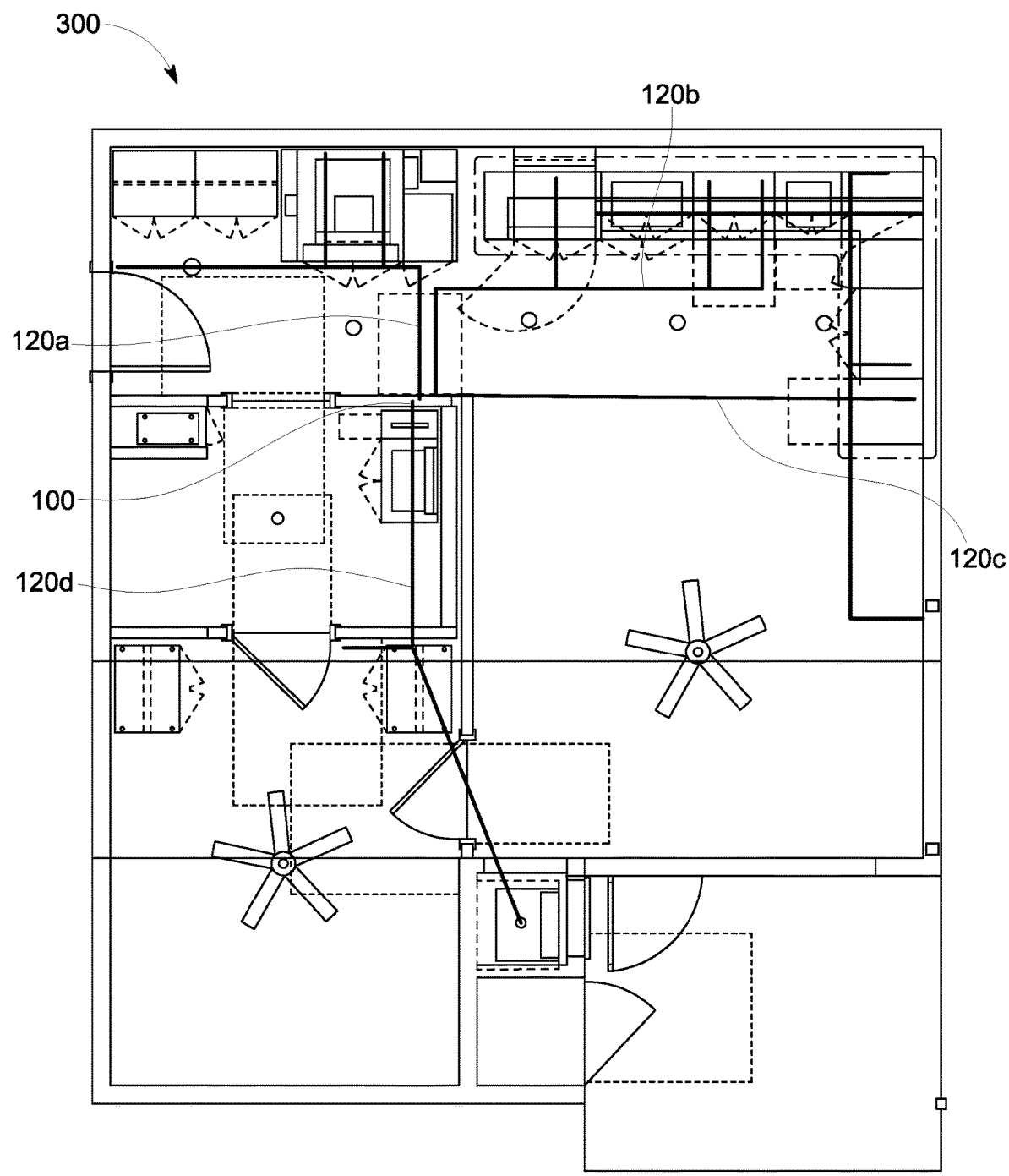
FIG. 28 shows an example plan of an apartment with the cables or wires of the load center assembly routed to designated locations.

FIG. 28 shows an example plan of an apartment 300 with the cables or wires of the load center assembly 100 routed to designated locations. The load center assembly 100 is installed in the wall frame 200 at a central location according to design plans. The cables or wires from a specific unwound wire harness 120 may be routed through the ceiling to a designated location to supply electricity. For example, the cables or wires from a first wire harness 120*a* may be routed to a first room or designated area, the cables or wires from a second wire harness 120*b* may be routed to a second room or designated area, the cables or wires from a third wire harness 120*c* may be routed to a third room or designated area, and a fourth wire harness 120*d* may be routed to a fourth room or designated area.

Having thus described in detail a preferred selection of embodiments of the present invention, it is to be appreciated and will be apparent to those skilled in the art that many physical changes could be made to the load center assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A prefabricated load center assembly, comprising:
a frame including a first side and a second side, the first side and the second side are substantially parallel and connected by a plurality of cross members;
an electrical panel assembly connected to the first side and the second side, the electrical panel assembly including a plurality of breakers; and
a plurality of electrical wire harnesses connected to the frame, each of the plurality of electrical wire harnesses including a plurality of wires, a first end of each wire of the plurality of wires is routed into the electrical panel assembly and is terminated in a corresponding breaker of the plurality of breakers;
wherein the prefabricated load center assembly is configured to be disposed in a wall frame including a top plate and a bottom plate, wherein the electrical panel assembly includes a top section including a plurality of openings configured to receive the plurality of wires from the plurality of electrical wire harnesses and a bottom section positioned opposite to the top section, wherein when the prefabricated load center assembly is disposed in the wall frame, the top section and the bottom plate are positioned on opposite sides of the bottom section,
and wherein edges of the frame comprise C-lip channels having a top portion and a bottom portion, wherein the bottom portion of the C-lip channels is secured to the bottom plate of the wall frame.

2. The prefabricated load center assembly of claim 1, further comprising a circuit guide configured to label the plurality of breakers.

3. The prefabricated load center assembly of claim 2, wherein the circuit guide is reusable.

4. The prefabricated load center assembly of claim 1, wherein the plurality of electrical wire harnesses is secured to the first side and the second side.

5. The prefabricated load center assembly of claim 1, wherein the plurality of electrical wire harnesses is secured to at least one of the plurality of cross members.

6. The prefabricated load center assembly of claim 1, wherein the plurality of electrical wire harnesses is secured to the frame via cable ties.

7. The prefabricated load center assembly of claim 1, wherein the frame is cold formed steel.

8. The prefabricated load center assembly of claim 1, further including a pigtail wire attached to a breaker of the plurality of breakers and terminated in a neutral bar.

9. The prefabricated load center assembly of claim 1, further including a copper ground wire terminated in a ground bar.

10. A wall, comprising:
a wall frame including a top plate, a bottom plate, a first stud, and a second stud; and
a load center assembly, the load center assembly including:
a frame including a first side and a second side, the first side and the second side are substantially parallel and connected by a plurality of cross members;
an electrical panel assembly connected to the first side and the second side, the electrical panel assembly including a plurality of breakers; and
a plurality of electrical wire harnesses connected to the frame, each of the plurality of electrical wire harnesses including a plurality of wires, a first end of each wire of the plurality of wires is routed into the electrical panel assembly and is terminated in a corresponding breaker of the plurality of breakers;

wherein the first side of the frame of the load center assembly is connected to the first stud and the second side of the frame of the load center assembly is connected to the second stud, wherein the electrical panel assembly includes a top section including a plurality of openings configured to receive the plurality of wires from the plurality of electrical wire harnesses and a bottom section positioned opposite to the top section, wherein when the load center assembly is disposed in the wall frame, the top section and the bottom plate are positioned on opposite sides of the bottom section, and wherein edges of the frame comprise C-lip channels having a top portion and a bottom portion, wherein the bottom portion of the C-lip channels is secured to the bottom plate of the wall frame.

11. The wall of claim 10, wherein the top plate of the wall frame includes at least one opening configured to receive a second end of each wire of the plurality of wires.

12. The wall of claim 10, wherein the load center assembly further includes a circuit guide configured to label the plurality of breakers.

13. The wall of claim 12, wherein the circuit guide is reusable.

14. The wall of claim 10, wherein the plurality of electrical wire harnesses is secured to the first side and the second side.

15. The wall of claim 10, wherein the plurality of electrical wire harnesses is secured to at least one of the plurality of cross members.

16. The wall of claim 10, wherein the plurality of electrical wire harnesses is secured to the frame via cable ties.

17. The wall of claim 10, wherein the frame is cold formed steel.

18. The wall of claim 10, wherein the wall frame is cold formed steel.

19. The wall of claim 10, wherein the load center assembly further includes a pigtail wire attached to a breaker of the plurality of breakers and terminated in a neutral bar.

20. The wall of claim 10, wherein the load center assembly further includes a copper ground wire terminated in a ground bar.

21. The prefabricated load center assembly of claim 1, further comprising tabs coupled to the electrical panel assembly, wherein the tabs are adapted to control insertion and alignment of the electrical panel assembly into the frame.

22. A wall, comprising: a wall frame including a top plate, a bottom plate, a first stud, and a second stud; and a load center assembly, the load center assembly including: a frame including a first side and a second side, the first side and the second side are substantially parallel and connected by a plurality of cross members; an electrical panel assembly connected to the first side and the second side, the electrical panel assembly including a plurality of breakers; and a plurality of electrical wire harnesses connected to the frame, each of the plurality of electrical wire harnesses including a plurality of wires, a first end of each wire of the plurality of wires is routed into the electrical panel assembly through a plurality of openings in a top section of the electrical panel assembly and is terminated in a corresponding breaker of the plurality of breakers; wherein the first side of the frame of the load center assembly is connected to the first stud, the second side of the frame of the load center assembly is connected to the second stud, and a bottom portion of an edge of the frame of the load center assembly is secured to the bottom plate of the wall frame, wherein the top plate of the wall frame includes at least one opening configured to receive a second end of each wire of the plurality of wires and wherein edges of the frame comprise C-lip channels having a top portion and a bottom portion, wherein the bottom portion of the C-lip channels is secured to the bottom plate of the wall frame.

23. The wall of claim 22, further comprising tabs coupled to the electrical panel assembly, wherein the tabs are adapted to control insertion and alignment of the electrical panel assembly into the frame.

24. A wall, comprising:
a wall frame including a top plate, a bottom plate, a first stud, and a second stud; and
a load center assembly, the load center assembly including:
a frame including a first side, a second side, and a bottom section, the first side and the second side are substantially parallel and connected by a plurality of cross members, wherein edges of the frame comprise C-lip channels;
an electrical panel assembly connected to the first side and the second side, the electrical panel assembly including a plurality of breakers; and
a plurality of electrical wire harnesses connected to the frame, each of the plurality of electrical wire harnesses including a plurality of wires, a first end of each wire of the plurality of wires is routed into the electrical panel assembly and is terminated in a corresponding breaker of the plurality of breakers;
wherein the first side of the frame of the load center assembly is connected to the first stud and the second side of the frame of the load center assembly is connected to the second stud, and the bottom section comprising a bottom portion of the C-lip channels is secured to the bottom plate of the wall frame.

25. The wall of claim 23, further comprising tabs coupled to the electrical panel assembly, wherein the tabs are adapted to control insertion and alignment of the electrical panel assembly into the frame.

* * * * *